(12) United States Patent
Mukherjee et al.

(10) Patent No.: US 7,634,482 B2
(45) Date of Patent: Dec. 15, 2009

(54) SYSTEM AND METHOD FOR DATA INTEGRATION USING MULTI-DIMENSIONAL, ASSOCIATIVE UNIQUE IDENTIFIERS

(75) Inventors: Arka Mukherjee, Rockaway, NJ (US); Oleg Margolin, Stamford, CT (US)

(73) Assignee: Global IDs Inc., Princeton, NJ (US)

( * ) Notice: Subject to any disclaimer, the term of this patent is extended or adjusted under 35 U.S.C. 154(b) by 128 days.

(21) Appl. No.: 10/889,229

(22) Filed: Jul. 12, 2004

(65) Prior Publication Data

US 2005/0097111 A1    May 5, 2005

Related U.S. Application Data (60) Provisional application No. 60/486,780, filed on Jul. 11, 2003.

(51) Int. Cl.
*G06F 17/00* (2006.01)
*G06F 17/30* (2006.01)

(52) U.S. Cl. .......................... 707/100; 707/3

(58) Field of Classification Search ............... 707/2, 707/3, 4, 6, 7, 100
See application file for complete search history.

(56) References Cited

U.S. PATENT DOCUMENTS

| | | | |
|---|---|---|---|
| 6,505,191 B1 * | 1/2003 | Baclawski | 707/3 |
| 6,658,413 B1 * | 12/2003 | Reddy et al. | 707/8 |
| 7,167,876 B2 * | 1/2007 | Cookson et al. | 707/200 |
| 2002/0165731 A1 * | 11/2002 | Dempsey | 705/1 |
| 2004/0172536 A1 * | 9/2004 | Malville et al. | 713/169 |

* cited by examiner

*Primary Examiner*—Tony Mahmoudi
*Assistant Examiner*—Fariborz Khoshnoodi
(74) *Attorney, Agent, or Firm*—Christensen O'Connor Johnson Kindness PLLC (57) ABSTRACT

A system and method for associating data objects utilizing unique identifiers is provided. Data objects are modeled utilizing a data object ontology. Unique identifiers for instances of each data object are calculated utilizing a selection of unique attributes of the data object ontology. Data objects from multiple data sources can be integrated utilizing the unique identifiers for each data object.

21 Claims, 6 Drawing Sheets

SYSTEM AND METHOD FOR DATA INTEGRATION USING MULTI-DIMENSIONAL, ASSOCIATIVE UNIQUE IDENTIFIERS

CROSS-REFERENCE TO RELATED APPLICATION

This application claims the benefit of U.S. Provisional Application No. 60/486,780, entitled METHOD FOR CREATING MULTIDIMENSIONAL GLOBALLY UNIQUE IDENTIFIERS, and filed on Jul. 11, 2003. U.S. Provisional Application No. 60/486,780 is incorporated by reference herein.

FIELD OF THE INVENTION

In general, the present application relates to computer software and data processing, and in particular, to a system and method for identifying data using multi-dimensional, associative unique identifiers.

BACKGROUND OF THE INVENTION

Generally described, large scale enterprise computer systems can include a number of data objects that are stored in various databases, software applications, and/or other data stores. In one aspect, the data objects can correspond to encapsulations of data relating to one or more business applications, which are generally referred to as business objects. Business objects can be in the form of structured or unstructured data relating to physical objects, such as equipment, personnel, etc. Additionally, business objects can also relate to abstract objects, such as database entities, textual descriptions of concepts, meta data, etc.

Generally described, business objects can be identified in accordance with conventional data processing approaches with an independently assigned domain specific unique identifier, such as a database key constraint. One skilled in the relevant art will appreciate that domain specific unique identifiers are not dependent on the specific business object data they represent. Instead, domain specific unique identifiers are limited to representing specific business object data and the identifier cannot be recreated for each instance of data representing a business object. Accordingly, a particular instance of a business object, such as a representation of an individual, may be associated with a number of unique identifiers. As the number of data sources containing business object data increases, such as independent databases, traditional data processing approaches become deficient in associating all business object data from each independent source.

Thus, there is a need for a system and method for uniquely representing business objects that is dependent on specific business object attributes and that is invariant with specific values of business object attribute data.

SUMMARY OF THE INVENTION

A system and method for associating data objects utilizing unique identifiers is provided. Data objects are modeled utilizing a data object ontology. Unique identifiers for instances of each data object are calculated utilizing a selection of unique attributes of the data object ontology. Data objects from multiple data sources can be integrated utilizing the unique identifiers for each data object.

In accordance with an aspect of the present invention, a method for processing data is provided. A data integration application associates a data object with a data object ontology corresponding to a hierarchy of data object dimensions. Additionally, the data integration application calculates a unique identifier for each instance of data object based upon a selection of a subset of data object dimensions.

In accordance with another aspect of the present invention, a method for processing data is provided. A data integration application associates a data object with a data object ontology corresponding to a hierarchy of data object dimensions. The data object ontology includes a invariance strength identifier for a source and target dimension in the hierarchy of data object dimensions. The data integration application also calculates a unique identifier for each instance of data object based upon a selection of a subset of data object dimensions having a high affinity metric.

In accordance with a further aspect of the present invention, a system for processing data is provided. The system includes a number of data sources including data object dimension data corresponding to instances of data objects. The system also includes a data integration application for obtaining the data object dimension data. The data integration application integrates the data object dimension data according to a unique identifier calculated from a hash of a selection of a subset of data object dimension data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for representing data. More specifically, in one aspect, the present invention relates to a system and method for representing data objects based upon unique identifiers corresponding to specific data object attribute values. In another aspect, the present invention relates to a system and method for identifying and integrating data from multiple data sources utilizing unique identifiers.

In an illustrative embodiment of the present invention, the data objects can correspond to physical objects in a defined domain, such as physical items associated with an enterprise. Additionally, the data objects can correspond to abstract objects, such as meta data, within the same domain. Although the present invention will be described in relation to data objects and data object attributes associated within a business context (e.g., business objects), one skilled in the relevant art will appreciate that the disclosed embodiments are illustrative in nature and should not be construed as limiting.

Figure 1:
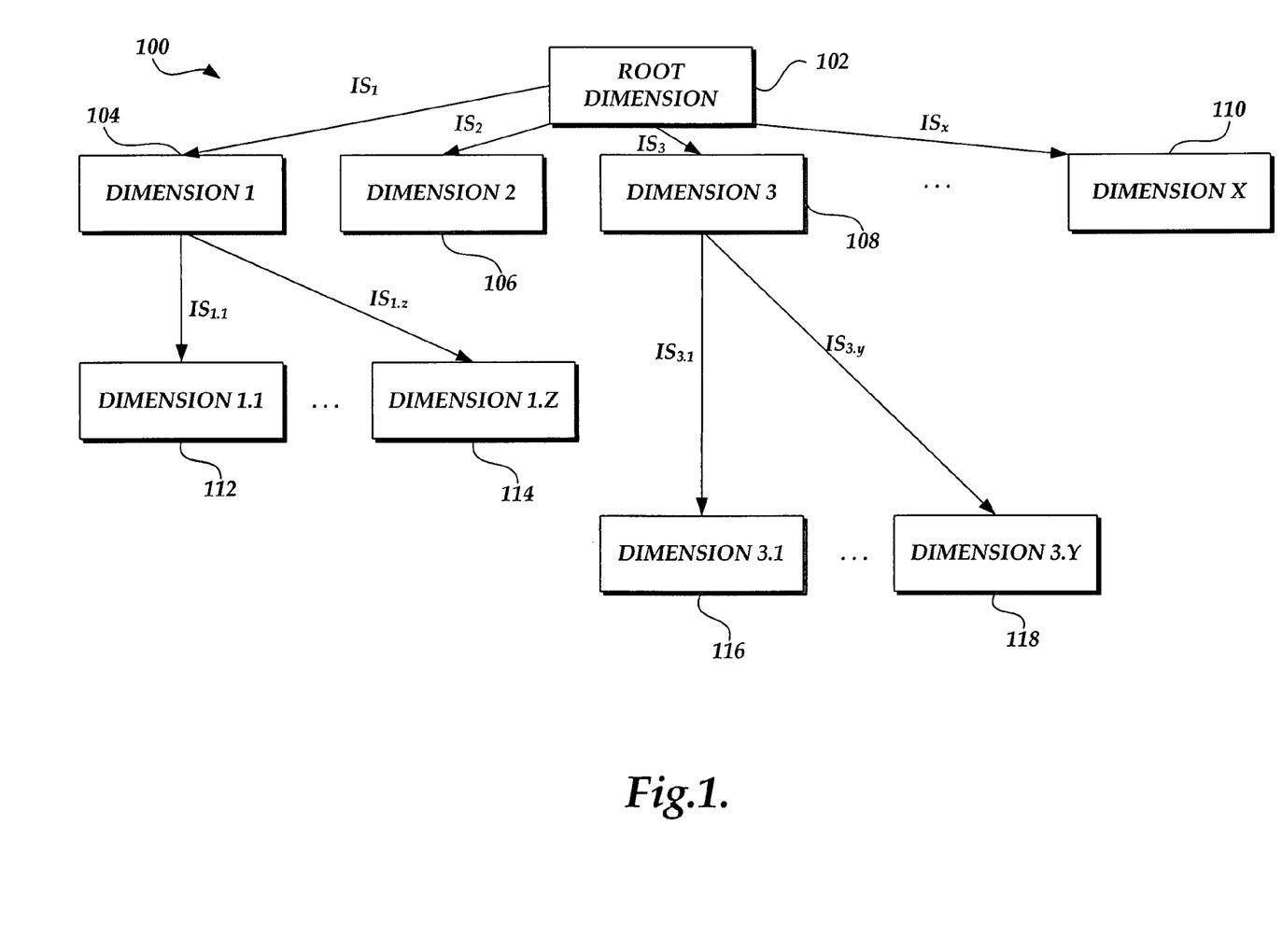
FIG. 1 is a block diagram of a business object ontology for generating a unique identifier for business object data in accordance an aspect of the present invention.

FIG. 1 is a block diagram of illustrative of a business object ontology 100 for generating a unique identifier for a business object. In an illustrative embodiment of the present invention, the business object ontology 100 corresponds to a hierarchy of dimensions can be representative of a particular business object concept. The values associated with each dimension for a particular instance of the ontology is then utilized to generate a unique identifier, as will be described in greater detail below. Based on the selection of specific attributes for the business object ontology 100, attribute data from any number of data sources should generate a similar unique identifier. Thus, the incoming data can be associated with the particular business object.

In an illustrative embodiment of the present invention, the business object ontology 100 corresponds to a particular business object concept. For example, the business object concept can be a representative of an aspect of physical items within an enterprise, such as a customer, a piece of equipment/machinery. A particular business object can be represented by a single business object ontology, such as a business ontology for representing each piece of machinery in a plant. Alternatively, business objects can be represented by multiple business object ontologies corresponding to different aspects of the business object. For example, one business object ontology may correspond to a representation of a customer from a financial perspective while another business object may correspond to a representation of the customer from a physical presence perspective (e.g., geographic-based location). Still further, a business object ontology may consist of a collection of other defined business ontologies. With reference to the previous example, a more global customer business ontology can incorporate the financial business ontology and the physical presence ontology.

With reference to FIG. 1, the business object ontology 100 corresponds to a multi-level hierarchy of dimensions that are representative, or otherwise associated with, the business object. The business object ontology 100 includes a root dimension 102 that is representative of the business object concept represented by the business object ontology. The business object ontology 100 also includes one or more dimensions 104, 106, 108 and 110 that are dependent on the root dimension 102. The root dimension, e.g., dimension 102, is considered to be a source dimension, while the dependent dimensions 104, 106, 108 and 110 are considered to be target dimensions. The business ontology 100 can also include another level of dimensions 112, 114, 116 and 118 that are dependent on the dimensions 104 and 108 respectively. In this respect, dimensions 104 and 108 are source dimensions, while dimensions 112-118 are target dimensions. Although the business ontology 100 is shown with three levels, one skilled in the relevant art will appreciate that alternative business ontologies can have any number of levels. Further, one skilled in the relevant art will appreciate that a business ontology can have any number of dimensions at each level in the hierarchy.

With continued reference to FIG. 1, in an illustrative embodiment of the present invention, the business object ontology 100 can include an invariant strength identifier for each source to target dimension relationship. The invariant strength identifier corresponds to an estimated correlation between the source dimension and the target dimension. The invariant strength identifier can be specified as a value in a range from 0.00 to 1.00, where 1.00 indicates that the value of the source will be invariant if the value of the target is invariant. As illustrated in FIG. 1, each link between a source dimension and a target dimension includes an invariant strength identifier.

In an illustrative embodiment of the present invention, an invariant strength identifier can be calculated manually by identifying the one or more dimensions that are not likely to change for a particular business object, such as a birth date. Additionally, the invariant strength identifier may be calculated based upon a statistical analysis of an enterprise data. In this approach, the invariant strength can be calculated in a manner defined below:

$$\text{temporal invariance of (dimension 1, object } A) = \text{num } A/N \quad (1)$$

where
num $A$=the maximum number of times a value of the dimension for an object appears in a snapshot of all records over a period of time; and
$N$=total number of data records analyzed.

$$\text{temporal invariance of (dimension 1, object)} = \min_i [\text{temporal invariance of (dimension 1, object } A)] \text{ for each object instance in the records.} \quad (2)$$

In an illustrative embodiment of the present invention, each dimension in the business object ontology 100 can be associated with specific attribute data. The data can include a dimension type identifier, a dimension version identifier, a timestamp identifier for the unique id, and a value for the dimension. In an illustrative embodiment of the present invention, the dimension type identifier identifies which business object ontology and the particular dimension to which the value corresponds. The version information indicates a version for the business object ontology if more than one version of the ontology is present. The timestamp identifier can include one or more timestamps relating to when the business ontology was created, modified and/or when it will expire. The value for the dimension can be in the form of a textual string that represents a value for the dimension (e.g., textual string including the name of the information). One skilled in the relevant art will appreciate that the business ontology may include additional or alternative dimension data.

Figure 2:
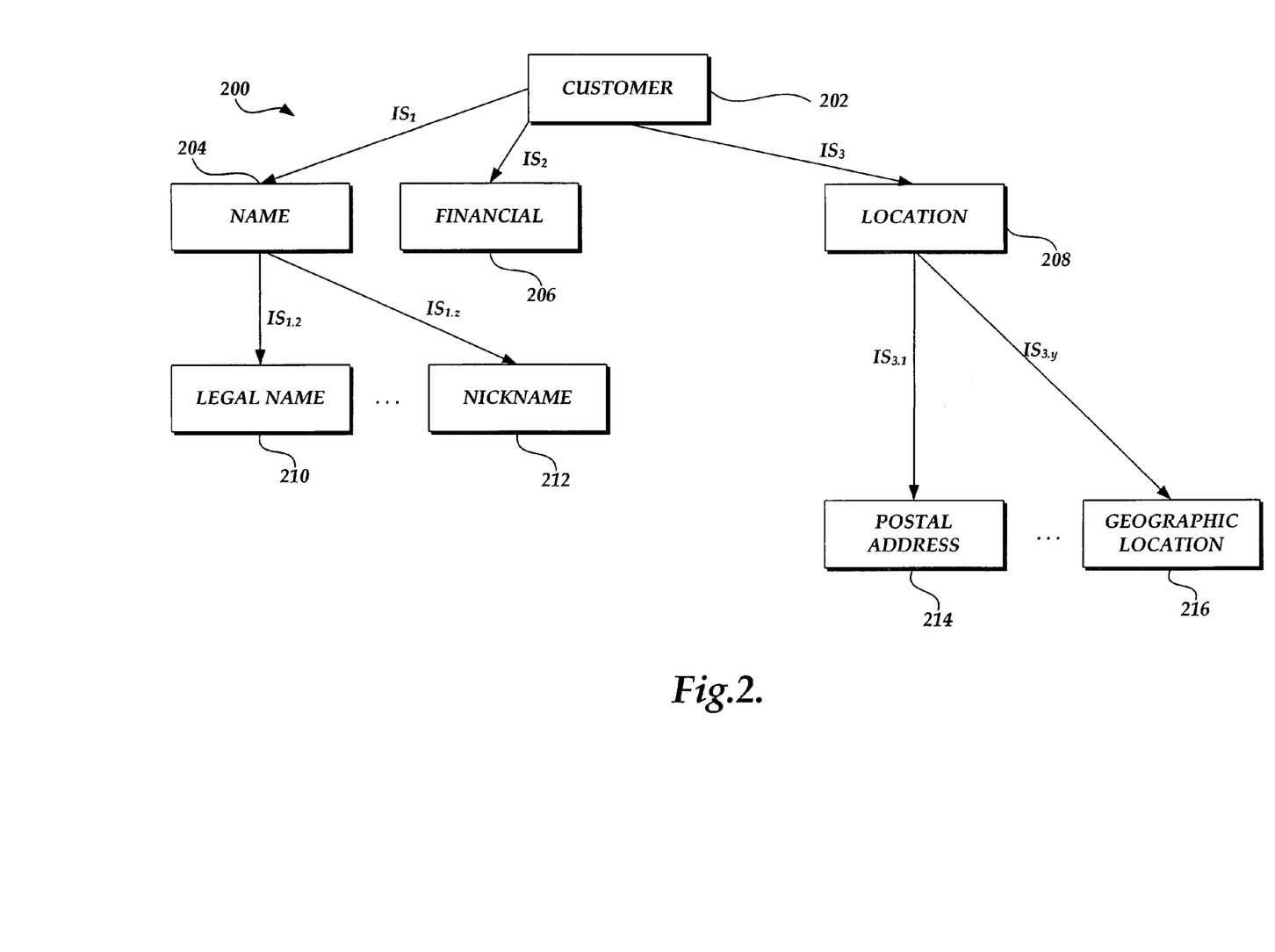
FIG. 2 is a block diagram of a business object ontology for a customer business object illustrating of multi-level hierarchy of unique identifier attributes in accordance with the present invention.

With reference now to FIG. 2, an illustrative business object ontology 200 for a customer business object will be described. The business object ontology 200 includes a root dimension 202, which in the illustrative example, corresponds to the representation of a customer in the define domain. The root dimension 202 includes three target dimensions 204, 206 and 208, which corresponds to an identification dimension, a financial dimension, and a location dimension, respectively. With continued reference to FIG. 2, dimension 204, name, has a number of additional target dimensions 210-212, such as legal name and nickname. Similarly, dimension 208, location, has a number of target dimensions 214-216, such as postal address and geographic location. As described above, each of the source/target dimensions in the business object ontology 200 includes an invariant strength identifier.

Figure 3:
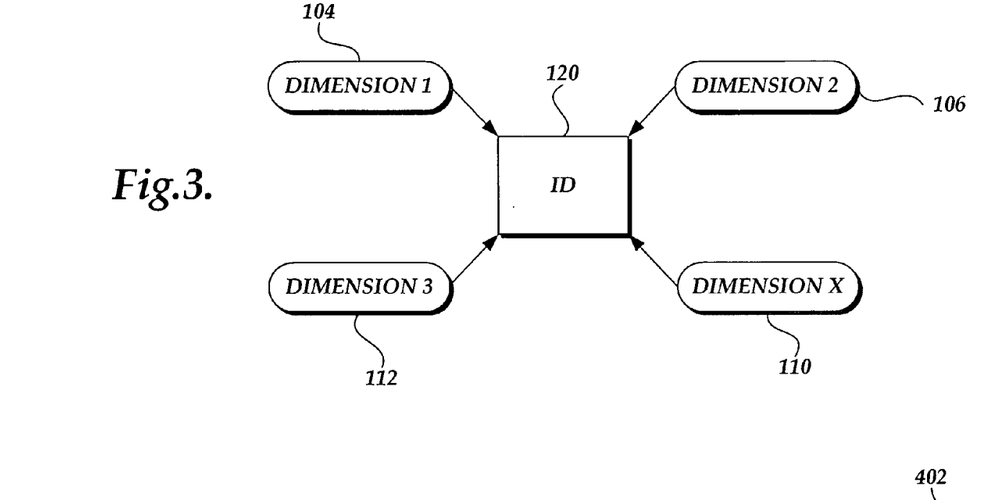
FIG. 3 is a block diagram illustrative of the generation of a unique identifier from multiple object attributes in accordance with the present invention.

In accordance with an aspect of the present invention, at least a portion of the values of the dimensions in the business ontology can be utilized to calculate a unique identifier for data associated with a business object. FIG. 3 is a block diagram illustrative of the generation of a unique identifier from multiple object dimensions in accordance with the present invention. As illustrated in FIG. 3, a selection of values for three dimensions of a business ontology 100 (FIG. 1) can be used to generate a unique identifier 120 for the particular business object.

In accordance with the present invention, the dimensions selected to generate the unique identifier 120 are most likely to have a unique value for each instance of an object in a particular domain. Thus, no two instances of a business object will be associated with the same unique identifier. To select which dimensions should be include in the calculation of a unique identifier, an affinity metric is calculated for each dimension in the business object ontology. The affinity metric consists of a uniqueness metric and the temporal invariance for each dimension, which will be described below.

In an illustrative embodiment of the present invention, the uniqueness metric is a measure of the uniqueness of dimension values for all records to be identified in a given domain. The uniqueness metric can be determined as follows:

$$\mu \text{ (affinity metric)} = \Sigma \text{ (max } |S|/N) \text{ for } K \text{ records} \quad (3)$$

where
S=subgroups that contain records having the same value for a particular dimension; and
N=number of groups of K records having the same value for a dimension.

Based upon the calculation of a uniqueness metric and the invariant strength of the source/target dimensions, the affinity metric for dimensions in a business ontology can be calculated as follows:

$$\text{affinity metric} = \alpha^* \mu + \beta^* \text{temporal invariance} \quad (4)$$

where
$\alpha, \beta$ are weighting factors and
$0 <= \alpha <= 1$;
$0 <= \beta <= 1$
$\alpha + \beta = 1$.

In an illustrative embodiment of the present invention, a unique identifier for an instance of a business object is composed of a hash of a number of dimension values having the highest affinity metric values. In an illustrative embodiment of the present invention, the md5 hashing algorithm may be used to generate a unique representation of data. The md5 hashing algorithm is well known in the relevant art and will not be described in greater detail. However, one skilled in the relevant art will appreciate that alternative hashing algorithms may be utilized in accordance with the present invention. Equation 5 defines the calculation of the unique id as follows:

$$\text{unique id} = \text{hash (values } D_1 - D_K) \quad (5)$$

where
$D_1 - D_K$ are dimension values having the highest K affinity metrics.

Figure 4:
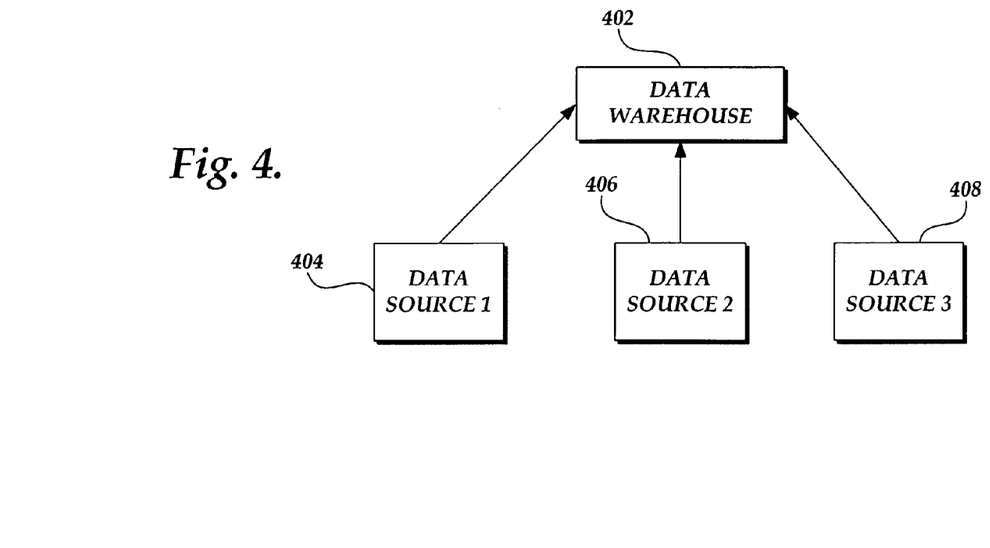
FIG. 4 is a block diagram illustrative of the integration of business object data from a plurality of data sources utilizing unique identifiers in accordance with the present invention.

In accordance with another aspect of the present invention, the unique identifiers calculated as described above, may be utilized to integrate and process data from a plurality of sources. FIG. 4 is a block diagram illustrative of the integration of business object data from a plurality of data sources utilizing unique identifiers in accordance with the present invention. As illustrated in FIG. 4, a data integration application 402 collects data from a number of data sources 404, 406, 408. The data integration application 402 may be remote from one or more data sources 404, 406, 408. Alternatively, the data integration application 402 may be integrated as component within one or more the data sources 404, 406, 408. Each data source includes some type of business object data that is accessible by the data integration application 402. The business object data for each data source 404, 406, 408 may be of the same type of data or of different data types.

In an illustrative embodiment of the present invention, the data integration application 402 calculates a unique identifier for the incoming data based upon a selected business ontology 100 (FIG. 1) for the business object data and the selected affinity metrics, as described above. Because the unique identifier can typically be associated with only one instance of a business object (e.g., a specific piece of equipment), the data integration application 402 can then map all incoming data to a specific business object. Accordingly, the data integration application 402 can associate different types of business object data from a variety of data sources to the same instance of a business object.

Figure 5A:
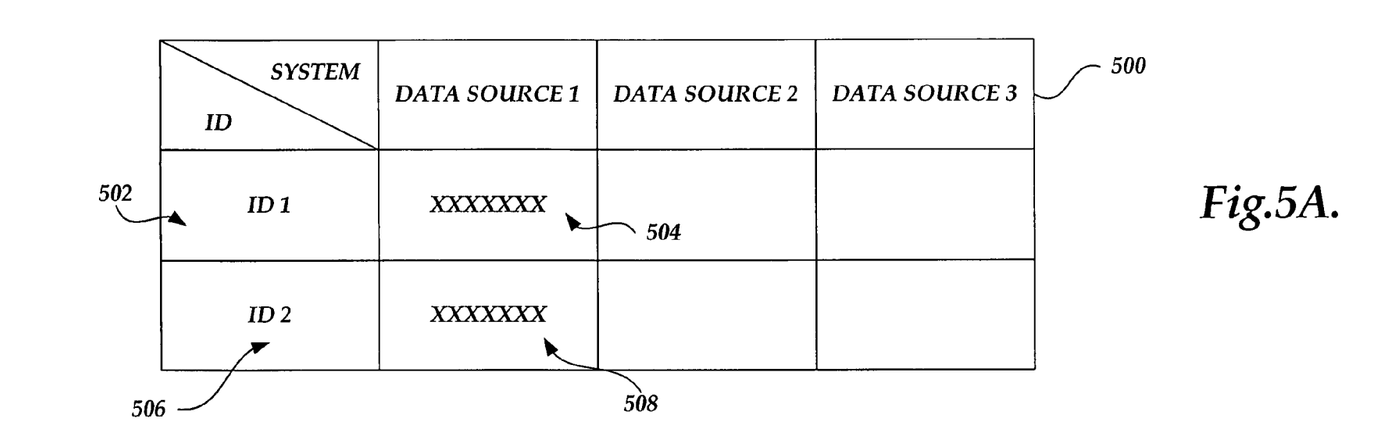
FIGS. 5A-5C are block diagrams of a mapping table for integrating business object data from multiple data sources utilizing unique identifiers in accordance with the present invention.
Figure 5B:
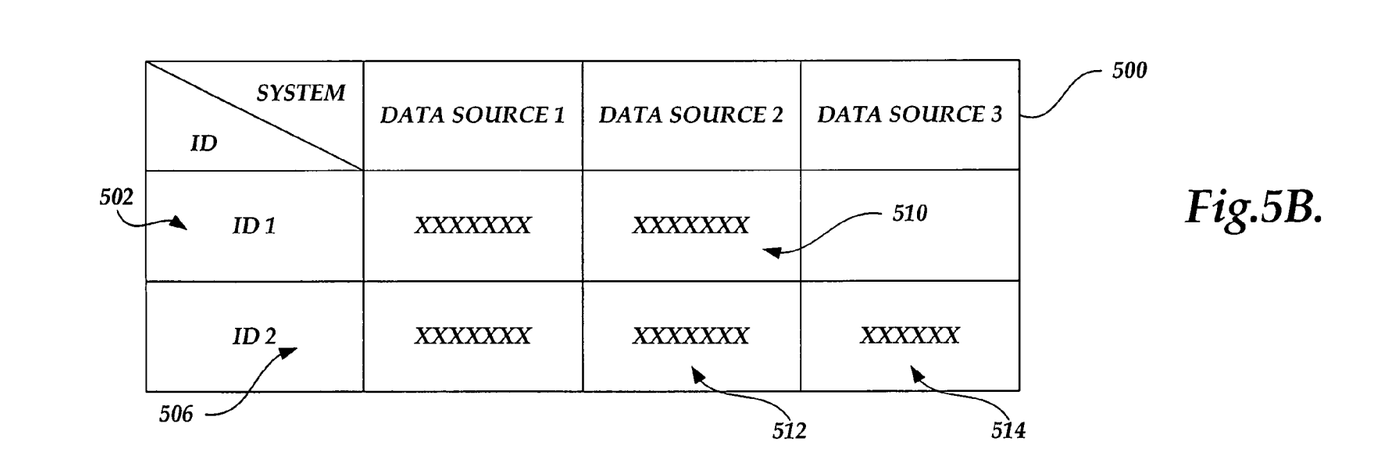
Figure 5C:
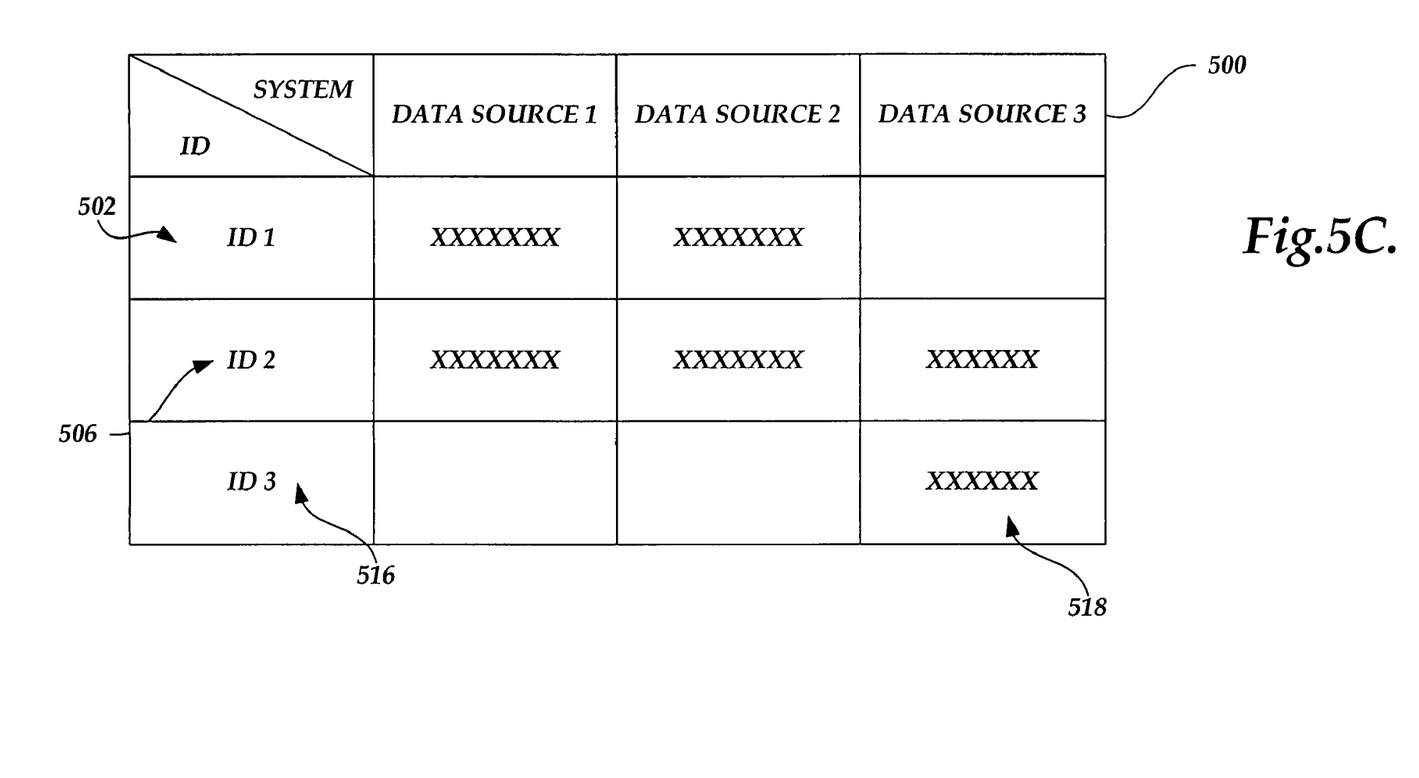

FIGS. 5A-5C are block diagrams of a table 500 utilized to associated incoming business object data from a variety of data sources in accordance with the present invention. With reference to FIG. 5A, the table 500 includes a number of rows corresponding to each unique identifier in the defined domain of data sources. The table 500 also includes a number of columns corresponding to each unique data source that will be integrated. As a source is integrated, a mapping of a unique id, such as id 502 and 506, is correlated to the identification/location of the data in the data sources. As illustrated in FIG. 5A, identification/locations 504, and 508 are correlated to ids 502, 506, respectively.

Figure 6:
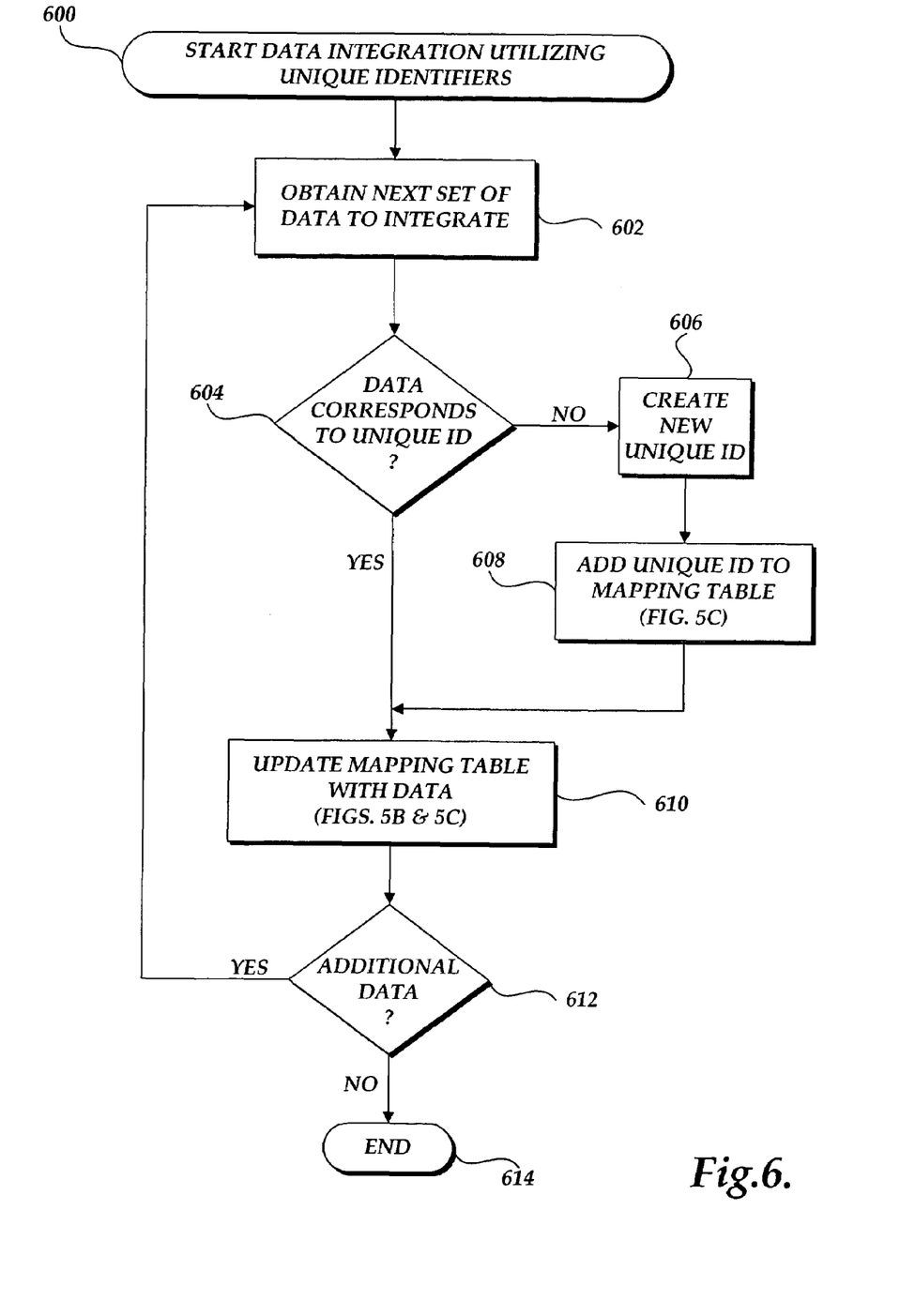
FIG. 6 is a flow diagram illustrative of a data processing routine for integrating business object data from multiple data sources utilizing unique identifiers in accordance with the present invention.

With reference to FIG. 6, a routine 600 for integrating data from a variety of data sources utilizing unique ids will be described. At block 602, the next set of data to be integrated is obtained. In an illustrative embodiment of the present invention, the next set of data may be a sequential process from each data source. Alternatively, a prioritization may be utilized to select specific data to be integrated. At decision block 604, a test is conducted to determine whether a unique id exists for the data to be integrated. As described above, the data integration application 402 (FIG. 4) calculates a unique id based upon a selection of a subset of dimension data from a business object ontology. If a unique id does not exist in the map table 500 (FIG. 5A), the data integration application 402 creates an entry for the new unique id at block 606 and adds it to the table 500 at block 608. Once the entry has been added to the table at block 606 or if an entry already exists at decision block 604, at block 610, the data integration application adds the data to the table 500. At decision block 612, a test is conducted to determine whether additional data is to be integrated. If additional data is to be integrated, the routine 600 returns to block 602. Alternatively, if no additional data is to be integrated, the routine 600 terminates at block 614.

With reference now to FIG. 5B, data identification 510 has been added to table 500 to correspond data source 2 to unique id 502. Likewise, data identifications 512 and 514 have been added to table 500 to correspond data sources 2 and 3 to unique ids 502, 504. With reference to FIG. 5C, unique id 516 has been added to table 500 to account for a new unique id and data identification 518 has been added to the table 500 to corresponds data source 3 to unique id 516.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer implemented method including a plurality of data objects stored in a plurality databases, a method implemented in instructions executed by a computer processor for processing data stored on a database, the method comprising:

associating each a data object in the plurality of data objects in the plurality of databases with a data object ontology corresponding to a hierarchy data object of dimensions of the data object, wherein the hierarchy comprises having at least one source dimension; and one or more target dimensions dependent on each source dimension and wherein each dimension associated with a specific attribute data; and for each data object of the plurality of data objects: based upon values of specific attribute data of a subset of data object dimensions associated with the data object comprising a source dimension and one or more dependent target dimensions;

providing the unique identifier to identify the data object;

calculating and associating a unique identifier for each data object based on applying a hashing algorithm executed by the computer processor to data stored on the database to a selected set of the objects' dimensions having the highest affinity metric values, and wherein the affinity metric for each dimension is calculated as a weighted sum of temporal invariance of a dimension and a uniqueness metric, wherein:

the temporal invariance of the object dimension is calculated as the minimum of the temporal invariance of any value appearing in the object dimension, the temporal invariance being calculated as the ratio of the number of times the value of the object dimension has changed over the total number of times the value of the dimension is observed in the databases over a period of time; and the uniqueness metric capturing whether data values in an object dimension are unique.

2. The method as recited in claim 1, wherein the data object ontology includes an invariance strength identifier for each source and one or more dependent target dimensions in the hierarchy of data object dimensions.

3. The method as recited in claim 2, wherein calculating a unique identifier includes selecting a subset of data objects corresponding to the invariance strength identifier.

4. The method as recited in claim 2, wherein calculating a unique identifier includes selecting a subset of data objects corresponding to a uniqueness metric for each dimension in the hierarchy of data object dimensions.

5. The method as recited in claim 1, further comprising integrating data from a plurality of data sources utilizing the unique identifier.

6. The method as recited in claim 1, wherein integrating data includes generating a table mapping unique identifiers to identifications of data in the data sources.

7. The method as recited in claim 1, wherein the data objects correspond to business objects and wherein the data object ontology corresponds to a business object ontology.

8. The method as recited in claim 1, wherein calculating a unique identifier includes creating a hash of the selection of a subset of data object dimensions.

9. A computer implemented method including a plurality of data objects stored in a plurality of databases, a method implemented in instructions executed by a computer processor for processing data stored on a database, the method comprising:

associating each data object in the plurality of databases with a data object ontology corresponding to a hierarchy of data object dimensions of the data object, wherein the hierarchy comprising at least one source dimension and one or more target dimensions dependent on each source dimension and wherein each dimension associated with a specific attribute data and wherein the data object ontology includes a invariance strength identifier computed using a hashing function for a source and target dimension in the hierarchy of data object dimensions executed by the computer processor; and for each of the plurality of data objects: calculating a unique identifier for a data object based upon values of specific attribute data of a subset of data object dimensions associated with the data object, said dimensions comprising a source dimension and one or more dependent target dimensions having a high affinity metric; and providing the unique identifier to identify the data object;

wherein the affinity metric for each dimension is calculated as a weighted sum of a temporal invariance of a dimension and a uniqueness metric, wherein: the temporal invariance of the dimension is calculated as the minimum of the temporal invariance of any value appearing in the dimension, the temporal invariance being calculated as the ratio of the number of times the value of the dimension has changed over the total number of times the value of the dimension is observed in a period of time; and the uniqueness metric capturing whether data values in the dimension are unique.

10. The method as recited in claim 9, further comprising integrating data from a plurality of data sources utilizing the unique identifier.

11. The method as recited in claim 9, wherein integrating data includes generating a table mapping unique identifiers to identifications of data in the data sources.

12. The method as recited in claim 9, wherein the data objects correspond to business objects and wherein the data object ontology corresponds to a business object ontology.

13. The method as recited in claim 9, wherein calculating a unique identifier includes creating a hash of the selection of a subset of data object dimensions.

14. The method as recited in claim 9, wherein the affinity metric corresponds to a combination of an invariance strength identifier and a uniqueness metric.

15. The method as recited in claim 9, wherein the affinity metric further comprises a weighted combination of the invariance strength identifier and the uniqueness metric.

16. A computing system comprised of modules stored on a database including a plurality of data objects modules for processing data objects stored in databases, the system comprising:

a processor;

a plurality of databases including data object dimension data corresponding to the plurality of data objects;

a data object ontology corresponding to a hierarchy of data object dimensions, wherein the hierarchy comprises at least one source dimension and one or more target dimensions dependent on each source dimension and wherein each dimension is associated with a specific attribute data of each data object; and a data integration application implemented in instructions accessed from the database and executed by a computer processor configured to:

obtain the data object dimension data; and, for each data object:

calculate a unique identifier for a data object based upon the temporal invariance and uniqueness of the values of specific attribute data of a subset of data object dimensions associated with the data object comprising a source dimension and one or more dependent target dimensions;

wherein the temporal invariance of an object dimension is calculated as the minimum of the temporal invariance of any value appearing in the object dimension, the temporal invariance being calculated as the ratio of the number of times the value of the dimension has changed over the total number of times the value of the dimension is observed in a period of time; and integrate the data object dimension data according to the calculated unique identifier; and provide the unique identifier to identify the data object.

17. The system as recited in claim 16, wherein the unique identifier is calculated from an invariance strength identifier for a source and target dimension in the hierarchy of data objects dimensions.

18. The system as recited in claim 17, wherein the unique identifier is calculated from a uniqueness metric for each dimension in the hierarchy of data objects dimensions.

19. The system as recited in claim 18, wherein the unique identifier is calculated from a weighted combination of the invariance strength identifier and the uniqueness metric.

20. The system as recited in claim 16, wherein the data integration application maintains a table mapping unique identifiers to identifications of data in the data sources.

21. The system as recited in claim 16, wherein the data objects correspond to business objects and wherein the data object ontology corresponds to a business object ontology.

* * * * *

UNITED STATES PATENT AND TRADEMARK OFFICE
CERTIFICATE OF CORRECTION

| | | |
|---|---|---|
| PATENT NO. | : 7,634,482 B2 | Page 1 of 1 |
| APPLICATION NO. | : 10/889229 | |
| DATED | : December 15, 2009 | |
| INVENTOR(S) | : Mukherjee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,634,482 B2  
APPLICATION NO. : 10/889229  
DATED : December 15, 2009  
INVENTOR(S) : A. Mukherjee et al.

Page 1 of 1

It is certified that error appears in the above-identified patent and that said Letters Patent is hereby corrected as shown below:

| COLUMN | LINE | ERROR |
|---|---|---|
| (6) (Claim 1, line 2) | 67 | after "plurality" insert --of-- |
| (7) (Claim 1, line 6) | 4 | after "associating" delete "each" |

Signed and Sealed this  
Twenty-sixth Day of April, 2011

David J. Kappos  
*Director of the United States Patent and Trademark Office*